United States Patent
Zhou et al.

(10) Patent No.: US 11,483,816 B2
(45) Date of Patent: Oct. 25, 2022

(54) SELECTIVE PHYSICAL DOWNLINK CONTROL CHANNEL REPETITION FOR RETRANSMISSIONS

(71) Applicant: QUALCOMM Incorporated, San Diego, CA (US)

(72) Inventors: Yan Zhou, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 24 days.

(21) Appl. No.: 16/841,192

(22) Filed: Apr. 6, 2020

(65) Prior Publication Data
US 2020/0351840 A1 Nov. 5, 2020

Related U.S. Application Data

(60) Provisional application No. 62/842,870, filed on May 3, 2019.

(51) Int. Cl.
*H04W 72/04* (2009.01)
*H04L 1/18* (2006.01)

(52) U.S. Cl.
CPC ......... *H04W 72/042* (2013.01); *H04L 1/1812* (2013.01); *H04W 72/0446* (2013.01)

(58) Field of Classification Search
CPC ................. H04W 72/0446; H04W 72/0453
See application file for complete search history.

(56) References Cited

U.S. PATENT DOCUMENTS

| | | | |
|---|---|---|---|
| 2017/0134124 A1* | 5/2017 | Lee | H04L 1/08 |
| 2018/0103468 A1 | 4/2018 | Li et al. | |
| 2018/0279152 A1* | 9/2018 | Kim | H04W 72/046 |
| 2019/0342865 A1* | 11/2019 | Shin | H04W 76/27 |
| 2019/0372719 A1* | 12/2019 | Talarico | H04W 72/042 |
| 2020/0107310 A1* | 4/2020 | Wang | H04W 72/046 |
| 2020/0221448 A1* | 7/2020 | Park | H04W 72/042 |
| 2020/0244411 A1* | 7/2020 | Takeda | H04B 7/0413 |
| 2020/0252956 A1* | 8/2020 | Liu | H04L 1/1671 |

FOREIGN PATENT DOCUMENTS

WO 2018228487 A1 12/2018

OTHER PUBLICATIONS

International Search Report and Written Opinion—PCT/US2020/027073—ISA/EPO—dated Jul. 8, 2020.

* cited by examiner

*Primary Examiner* — Ayaz R Sheikh
*Assistant Examiner* — Debebe A Asefa
(74) *Attorney, Agent, or Firm* — Patterson & Sheridan, LLP

(57) ABSTRACT

Certain aspects of the present disclosure provide techniques for selectively activating physical downlink control channel (PDCCH) repetition for retransmissions in wireless communications systems. In an exemplary method, a base station (BS) may transmit, without repetition, a physical downlink shared channel (PDSCH) to a user equipment (UE) in a set of initial transmissions in a period of a transmission cycle; and activate repetition including multiple transmissions for physical downlink control channels (PDCCHs) in a potential retransmission slot for the UE during the period.

29 Claims, 9 Drawing Sheets ns systems.

SELECTIVE PHYSICAL DOWNLINK CONTROL CHANNEL REPETITION FOR RETRANSMISSIONS

CLAIM OF PRIORITY UNDER 35 U.S.C. § 119

The present application for patent claims benefit of U.S. Provisional Patent Application Ser. No. 62/842,870, filed May 3, 2019, assigned to the assignee hereof and hereby expressly incorporated by reference herein.

BACKGROUND

Field of the Disclosure

Aspects of the present disclosure relate to wireless communications, and more particularly, to techniques for selectively activating physical downlink control channel (PDCCH) repetition for retransmissions in wireless communications systems.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication that may be performed by a base station (BS). The method generally includes transmitting, without repetition, a physical downlink shared channel (PDSCH) to a user equipment (UE) in a set of initial transmissions in a period of a transmission cycle; and activating repetition including multiple transmissions for physical downlink control channels (PDCCHs) in a potential retransmission slot for the UE during the period.

Certain aspects provide a method for wireless communication that may be performed by a user equipment (UE). The method generally includes obtaining an indication that a physical downlink shared channel (PDSCH) is scheduled to be transmitted, without repetition, to the UE in a set of initial transmissions in a period of a transmission cycle; and activating repetition including multiple receptions for physical downlink control channels (PDCCHs) in a potential retransmission slot for the UE during the period.

Certain aspects provide an apparatus for wireless communications. The apparatus generally includes a processor configured to: transmit, without repetition, a physical downlink shared channel (PDSCH) to a user equipment (UE) in a set of initial transmissions in a period of a transmission cycle; and activate repetition, including multiple transmissions for physical downlink control channels (PDCCHs), in a potential retransmission slot for the UE during the period; and a memory coupled with the processor.

Certain aspects provide an apparatus for wireless communications. The apparatus generally includes a processor configured to: obtain an indication that a physical downlink shared channel (PDSCH) is scheduled to be transmitted, without repetition, to the apparatus in a set of initial transmissions in a period of a transmission cycle; and activate repetition, including multiple receptions for physical downlink control channels (PDCCHs), in a potential retransmission slot for the apparatus during the period; and a memory coupled with the processor.

Certain aspects provide an apparatus for wireless communication. The apparatus generally includes means for transmitting, without repetition, a physical downlink shared channel (PDSCH) to a user equipment (UE) in a set of initial transmissions in a period of a transmission cycle; and means for activating repetition including multiple transmissions for physical downlink control channels (PDCCHs) in a potential retransmission slot for the UE during the period.

Certain aspects provide an apparatus for wireless communication. The apparatus generally includes means for obtaining an indication that a physical downlink shared channel (PDSCH) is scheduled to be transmitted, without repetition, to the apparatus in a set of initial transmissions in a period of a transmission cycle; and means for activating repetition including multiple receptions for physical downlink control channels (PDCCHs) in a potential retransmission slot for the UE during the period.

Certain aspects provide a computer-readable medium for wireless communication. The computer-readable medium includes instructions that, when executed by a processing system, cause the processing system to perform operations generally including transmitting, without repetition, a physical downlink shared channel (PDSCH) to a user equipment (UE) in a set of initial transmissions in a period of a transmission cycle; and activating repetition including multiple transmissions for physical downlink control channels (PDCCHs) in a potential retransmission slot for the UE during the period.

Certain aspects provide a computer-readable medium for wireless communication. The computer-readable medium includes instructions that, when executed by a processing system, cause the processing system to perform operations generally including obtaining an indication that a physical downlink shared channel (PDSCH) is scheduled to be transmitted, without repetition, to a user equipment (UE) in a set of initial transmissions in a period of a transmission cycle; and activating repetition including multiple receptions for physical downlink control channels (PDCCHs) in a potential retransmission slot for the UE during the period.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
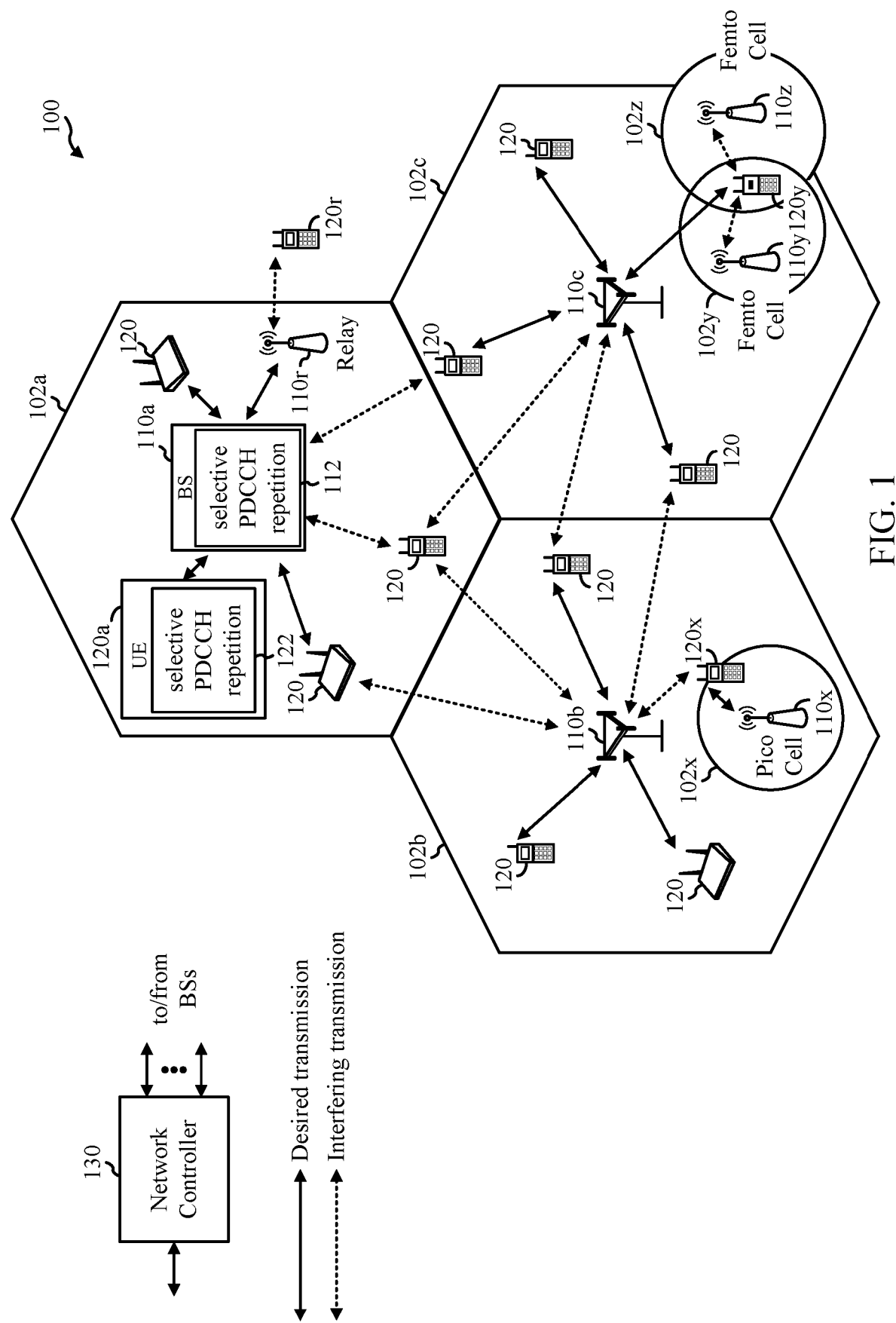
FIG. 1 is a block diagram conceptually illustrating an example telecommunications system, in accordance with certain aspects of the present disclosure.

Aspects of the present disclosure provide apparatus, methods, processing systems, and computer readable mediums for selectively activating physical downlink control channel (PDCCH) repetition for retransmissions in wireless communications systems. In wireless communications systems, such as $5^{th}$ generation (5G) or new radio (NR) systems, repetition of PDCCH transmission can improve reliability of the system by improving the probability that a recipient of the PDCCH will successfully receive and decode the repeated PDCCHs, but repeating PDCCH transmissions also increases overhead of the communications system, as the repeated PDCCH transmissions use transmission resources that could instead be used for transmitting other data. In ultra reliable low latency communications (URLLC), the additional overhead may have additional significance, as latency requirements for URLLC may limit a maximum number of transmissions that can be transmitted to complete an URLLC communication.

In aspects of the present disclosure, a network (e.g., a network entity, such as a base station) may make transmissions without repetition and then activate repetition of PDCCHs for retransmissions of the original transmissions. Thus, the network conserves transmission resource by not having repetition activated at all times, while improving reliability by using repetition for retransmissions of transmissions that failed on a first attempt.

According to aspects of the present transmission, a network may determine to selectively activate PDCCH repetition for retransmissions when an initial transmission has a block error rate (BLER) below a threshold.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

New Radio (NR) is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless communication network 100 in which aspects of the present disclosure may be performed. For example, the wireless communication network 100 may be an NR system (e.g., a 5GNR network). For example, as shown in FIG. 1, the UE 120*a* has a selective PDCCH repetition module 122 that may be configured for selectively activating PDCCH repetition for retransmissions, according to aspects described herein. For example, as shown in FIG. 1, the BS 110*a* has a selective PDCCH repetition module 112 that may be configured for selectively activating PDCCH repetition for retransmissions, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wristband, smartjewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
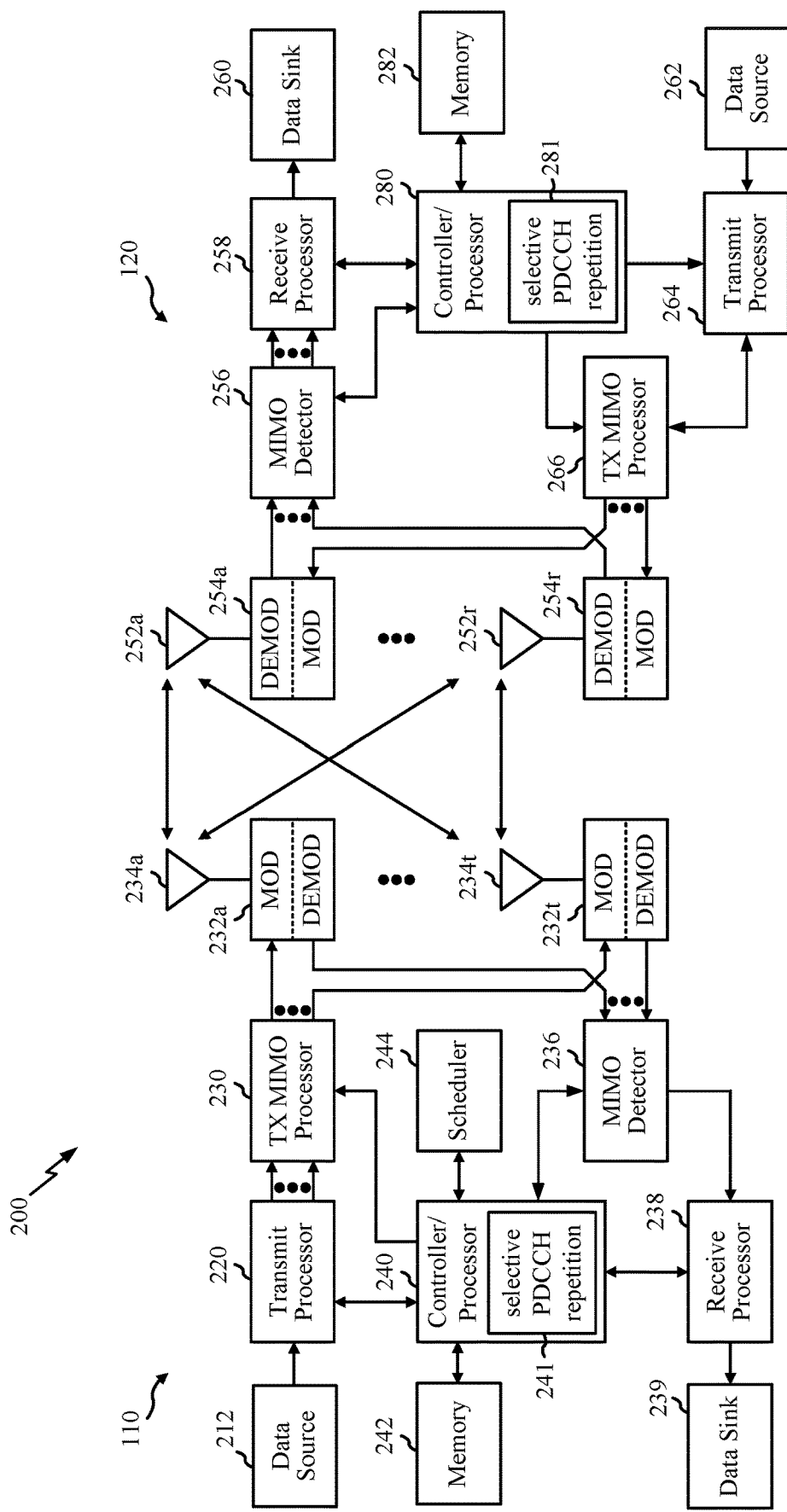
FIG. 2 is a block diagram illustrating an example architecture of a distributed radio access network (RAN), in accordance with certain aspects of the present disclosure.
Figure 8:
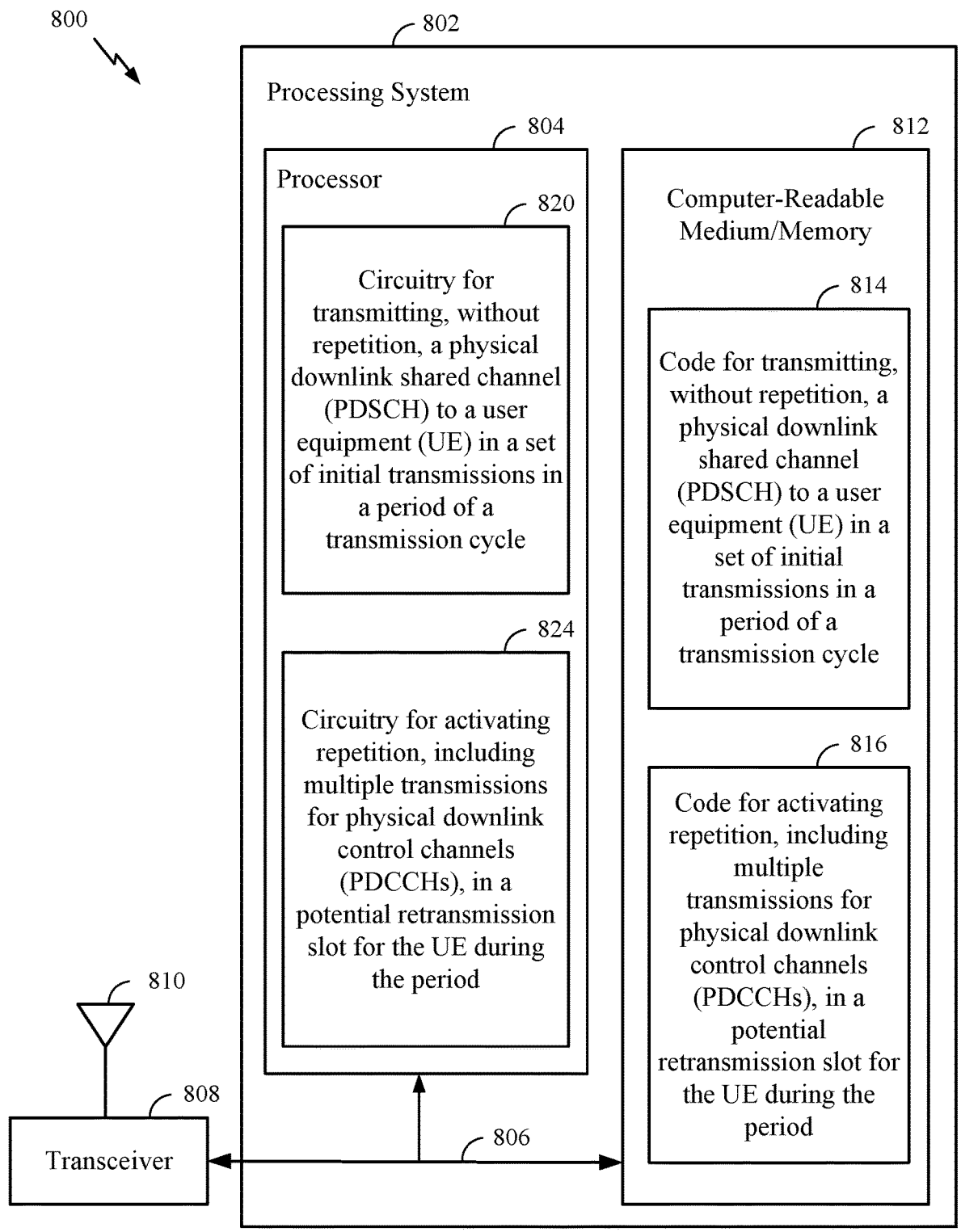
FIG. 8 illustrates a communications device that may include various components (e.g., corresponding to means-plus-function components) configured to perform operations for the techniques disclosed herein, such as the operations illustrated in FIG. 6.
Figure 9:
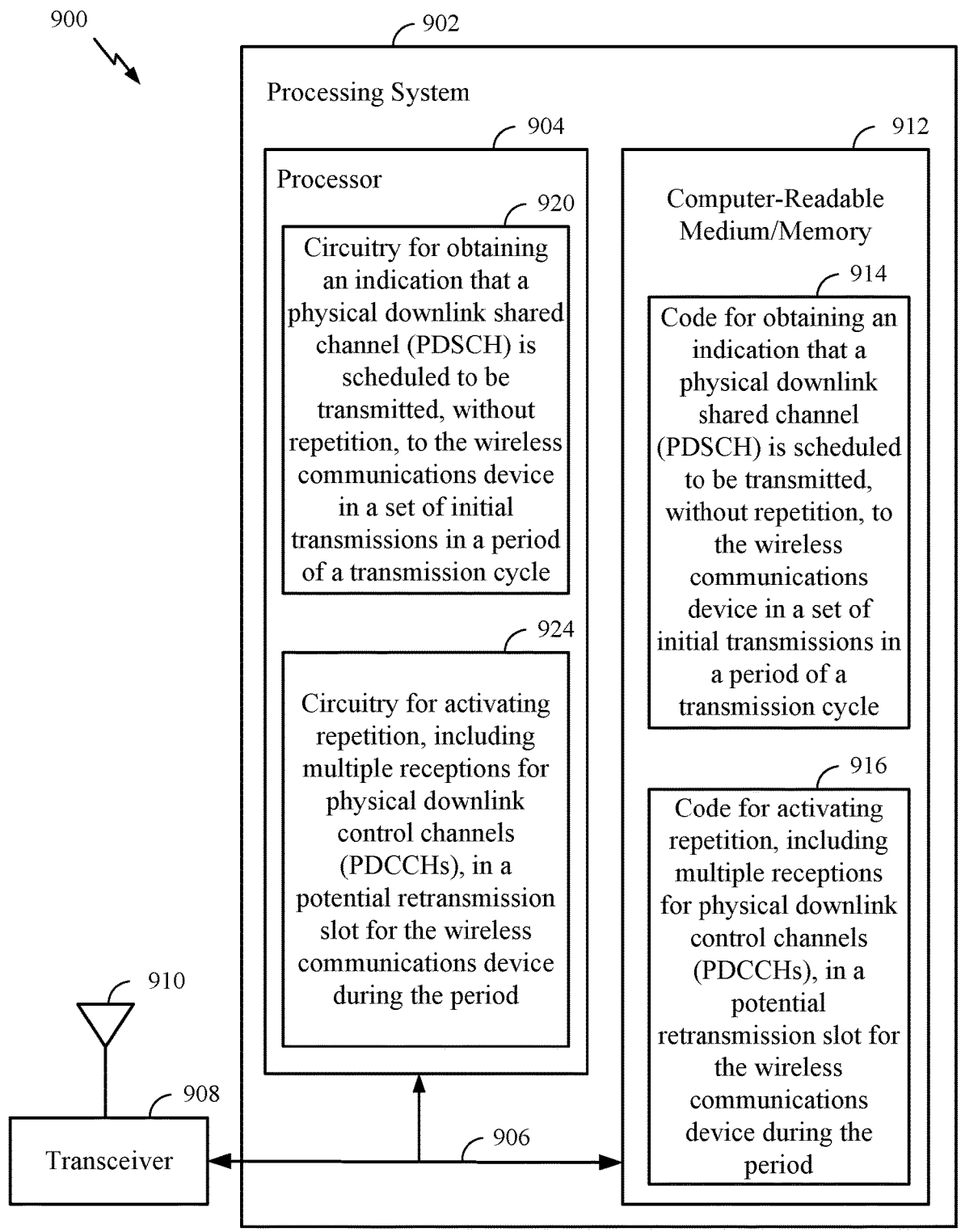
FIG. 9 illustrates a communications device that may include various components (e.g., corresponding to means-plus-function components) configured to perform operations for the techniques disclosed herein, such as the operations illustrated in FIG. 7.

FIG. 2 illustrates example components of BS 110 and UE 120 (e.g., in the wireless communication network 100 of FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein. For example, as shown in FIG. 8, the controller/processor 240 of the BS 110 has a selective PDCCH repetition module 241 that may be configured for selectively activating PDCCH repetition for retransmissions, according to aspects described herein. For example, as shown in FIG. 9, the controller/processor 280 of the UE 120 has a selective PDCCH repetition module 281 that may be configured for selectively activating PDCCH repetition for retransmissions, according to aspects described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

Figure 3:
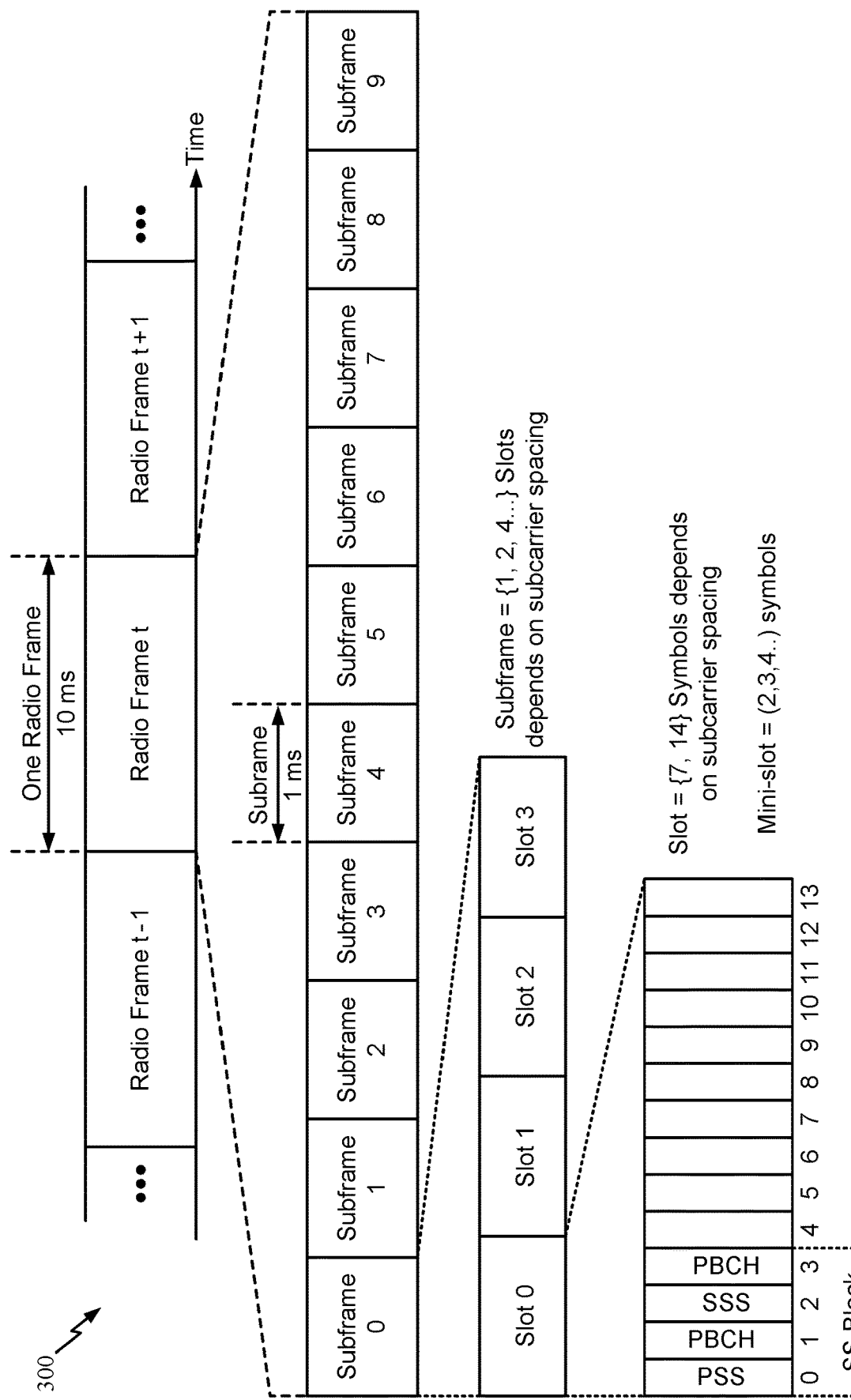
FIG. 3 illustrates an example of a frame format for a telecommunication system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Selective Physical Downlink Control Channel Repetition for Retransmissions Aspects of the present disclosure provide apparatus, methods, processing systems, and computer readable mediums for selectively activating physical downlink control channel (PDCCH) repetition for retransmissions in wireless communications systems. In wireless communications systems, such as 5$^{th}$ generation (5G) or new radio (NR) systems, repetition of PDCCH transmission can improve reliability of the system by improving the probability that a recipient of the PDCCH will successfully receive and decode at least one of the repeated PDCCHs, but repeating PDCCH transmissions also increases overhead of the communications system, as the repeated PDCCH transmissions use transmission resources that could instead be used for transmitting other data. In ultra reliable low latency communications (URLLC), the additional overhead may have additional significance, as latency requirements for URLLC may limit a maximum number of transmissions that can be transmitted to complete an URLLC communication.

In aspects of the present disclosure, a network (e.g., a network entity, such as a base station) may make transmissions without repetition and then activate repetition of PDCCHs for retransmissions (e.g., retransmissions triggered when the recipient does not implicitly or explicitly acknowledge the original transmission) of the original transmissions. Thus, the network conserves transmission resource by not having repetition activated at all times, while improving reliability by using repetition for retransmissions of transmissions that failed on a first attempt.

According to aspects of the present transmission, a network (e.g., a network entity, such as a base station) may determine to selectively activate PDCCH repetition for retransmissions when an initial transmission has a block error rate (BLER) below a threshold. Selectively activating PDCCH repetition for retransmissions when a BLER for an initial transmission is below a threshold may cause the network to use transmission resources more efficiently than activating PDCCH repetition for retransmissions in all situations, because when the BLER is higher than the threshold, it is more likely that all of the retransmissions will not be successfully decoded, and it is more efficient to take other measures (e.g., changing a coding rate) to ensure the transmission is received and decoded.

Figure 4:
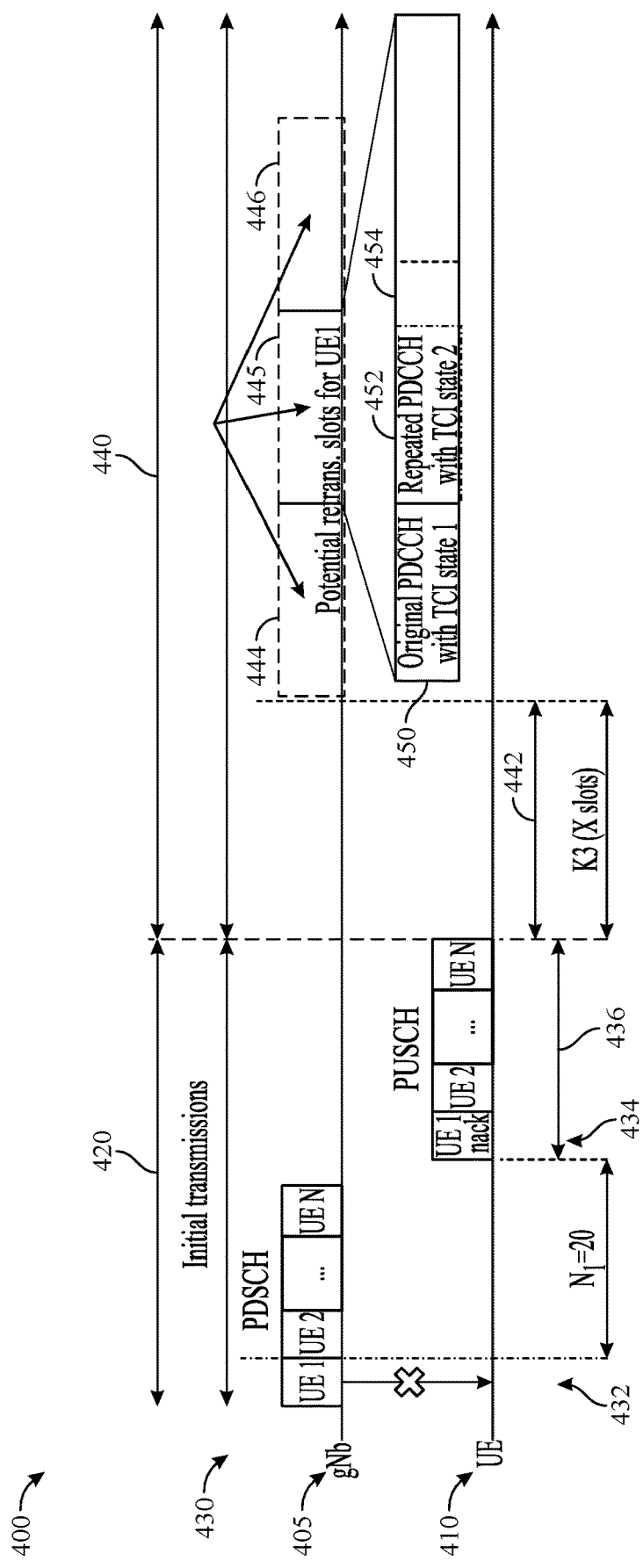
FIG. 4 is an exemplary transmission timeline of a network using selective PDDCH repetition, according to aspects of the present disclosure.

FIG. 4 is an exemplary transmission timeline 400 of a network using selective PDDCH repetition, according to aspects of the present disclosure. The timeline 405 represents transmissions by a BS, such as a next generation NodeB (gNB) or a BS 110, shown in FIGS. 1-2. The timeline 410 represents transmissions by UEs 1-N, such as UE 120, shown in FIGS. 1-2. The periods 420 and 440 together represent a period of a transmission cycle, which may have a period of one millisecond, i.e., equivalent to the length of a subframe, as illustrated in FIG. 3. The period 420 may be used for initial transmissions of the transmission cycle. At 430, the BS transmits a set of PDSCHs to UEs 1-N during the period 420. At 432, UE 1 fails to receive and/or decode the PDSCH transmitted to UE 1 by the BS. During the period 436, the UEs 1-N transmit PUSCHs to the BS. At 434, UE 1 transmits a negative acknowledgment (NACK) indicating that UE 1 did not successfully decode the PDSCH transmitted by the BS at 432. During the period 442, the BS processes the uplink transmissions from the UEs 1-N. The period 442 may have a length of 2-3 slots, for example. The number of slots in the period 442 may be referred to as a threshold number of slots. During the portion of period 440 remaining after period 442, a number of slots 444, 445, 446 occur that may be utilized by the BS for retransmissions to the UEs 1-N. These slots may be referred to herein as "potential retransmission slots" for a UE. The BS may activate repetition (e.g., begin repeated transmissions of downlink channels, such as PDCCHs and PDSCHs) including multiple transmissions for PDCCHs in one or more of the potential retransmission slots. The BS may, for example, use a CORESET for transmission of the downlink control channels when the BS has activated repetition that the BS does not use when the BS has not activated repetition. In another example, the BS may use a search space (e.g., a UE-specific search space (USS)) for transmission of the downlink control channels when the BS has activated repetition that the BS does not use when the BS has not activated repetition. In the potential retransmission slot 445, the BS transmits a PDCCH 450 in a first search space, (i.e., with a first transmission configuration indication (TCI), also referred to as TCI state 1). The PDCCH 450 indicates to UE 1 that the BS, at 454, is retransmitting the PDSCH that the UE failed to receive at 432. The BS also transmits a repeated PDCCH 452 (that is, another PDCCH indicating the retransmission of the PDSCH at 454) in a second search space (i.e., with TCI state 2) in the potential retransmission slot 445. Also, the UE may activate repetition (e.g., keeping a receiver active and monitoring for downlink channels, such as PDCCHs, and not performing discontinuous reception (DRX) or microsleeps) including multiple receptions for PDCCHs in one or more of the potential retransmission slots. The UE may, for example, monitor a CORESET for downlink control channels when the UE has activated repetition that the UE does not monitor when the UE has not activated repetition. In another example, the UE may monitor a search space (e.g., a UE-specific search space (USS)) for the downlink control channels when the UE has activated repetition that the UE does not monitor when the UE has not activated repetition. The UE may receive one or both of the PDCCH 450 and the repeated PDCCH 452 and then receive the retransmission 454 of the PDSCH.

In aspects of the present disclosure, selective activation of PDCCH repetition may be used in a network in which semi-persistently scheduled (SPS) downlink and uplink transmissions are the initial transmissions, i.e., the PDSCHs and PUSCHs in period 420 the transmission cycle shown in FIG. 4.

According to aspects of the present disclosure, in order to further reduce overhead, PDCCH repetition may be activated on-demand over certain slots (i.e., activated on-demand in certain potential retransmission slots, and not in all potential retransmission slots).

In aspects of the present disclosure, if PDCCH repetition is not activated in a slot (e.g., a potential retransmission slot), then a BS and/or a UE will apply the original search space (SS) set and control resource set (CORESET) for that slot. That is, if a BS transmits a control channel (e.g., a PDCCH) in a slot and PDCCH repetition is not activated for that slot, then the BS transmits the control channel on a CORESET configured in the slot without PDCCH repetition. Similarly, if a UE monitors for a control channel (e.g., a PDCCH) in a slot and PDCCH repetition is not activated for that slot, then the UE monitors for the control channel on a CORESET configured in the slot without PDCCH repetition.

According to aspects of the present disclosure, on-demand PDCCH repetition can be activated (e.g., by a UE or a BS) when an initial DL transmission (e.g., the PDSCH at 432 in FIG. 4) fails.

In aspects of the present disclosure, a UE may activate on-demand PDCCH repetition when the UE fails to decode a PDSCH in a set of initial transmissions and/or when the UE transmits a negative acknowledgment (NACK) in response to a PDSCH in a set of initial transmissions.

According to aspects of the present disclosure, a BS may activate on-demand PDCCH repetition when the BS receives a NACK from a UE in response to an initial DL transmission and/or when the BS does not decode an uplink transmission (e.g., a PUCCH) from a UE corresponding to an initial DL transmission (e.g., a PDSCH that the UE should acknowledge in a PUCCH) to the UE.

In aspects of the present disclosure, in most cases a BS and a UE will both activate on-demand PDCCH repetition or neither will activate on-demand PDCCH repetition. However, in certain aspects of the present disclosure, a BS and a UE may have a misalignment in on-demand PDCCH repetition. If a UE activates on-demand PDCCH repetition, then the UE transmitted a NACK in response to an initial transmission and the BS also activates on-demand repetition. If a UE does not activate on-demand PDCCH repetition (i.e., the UE decoded an initial DL transmission and transmitted a corresponding uplink transmission) and the BS fails to decode the uplink transmission from the UE corresponding to the initial DL transmission, then the BS may activate on-demand PDCCH repetition. This misalignment may not affect UL retransmissions, since the UE still monitors the original SS for PDCCHs, and the BS will transmit at least one of the PDCCH retransmissions in the original SS. The BS uses the PDCCH retransmission to schedule the UL retransmission, so the UE should still receive the PDCCH and transmit the UL retransmission.

Figure 5:
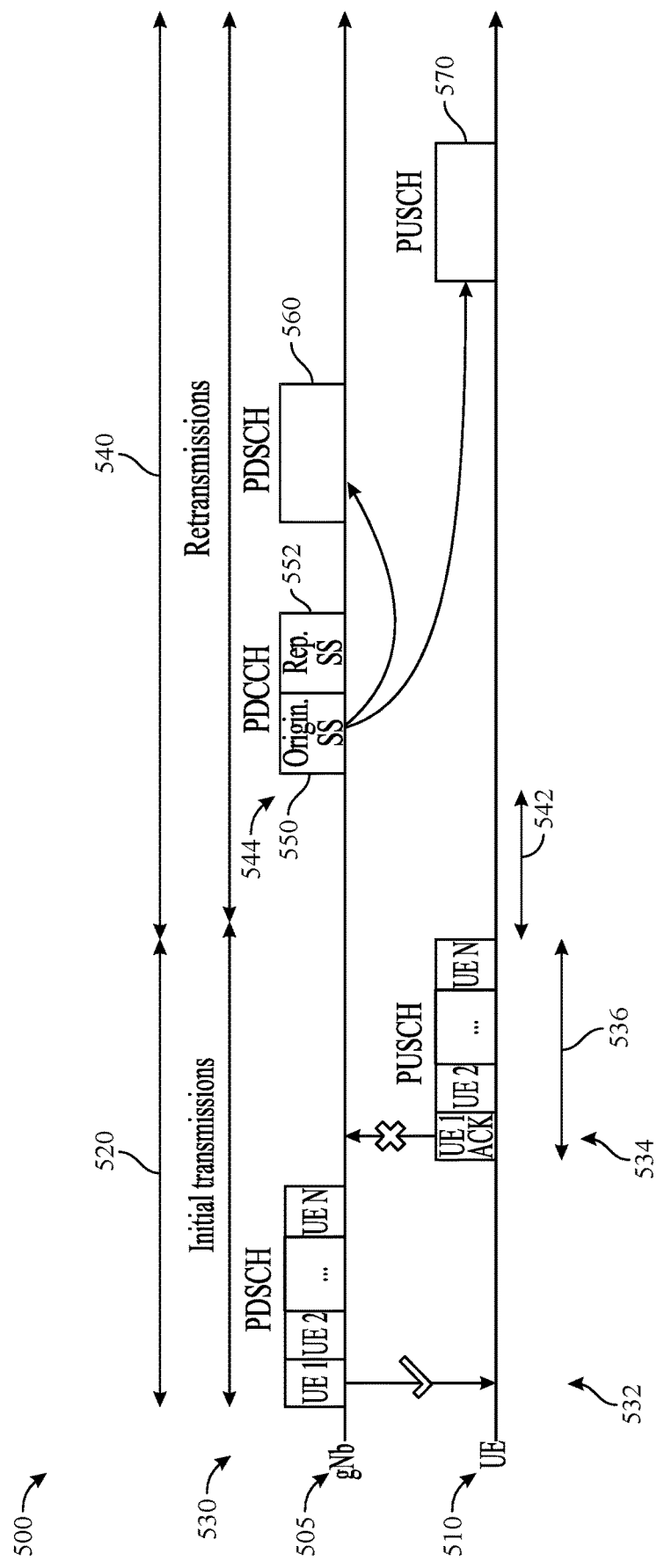
FIG. 5 is an exemplary transmission timeline of a network using on-demand PDDCH repetition, according to aspects of the present disclosure.

FIG. 5 is an exemplary transmission timeline 500 of a network using on-demand PDDCH repetition, according to aspects of the present disclosure. The timeline 505 represents transmissions by a BS, such as a next generation NodeB (gNB) or a BS 110, shown in FIGS. 1-2. The timeline 510 represents transmissions by one or more UEs 1-N, such as UE 120, shown in FIGS. 1-2. The periods 520 and 540 together represent a period of a transmission cycle, which may have a period of one millisecond, i.e., equivalent to the length of a subframe, as illustrated in FIG. 3. The period 520 may be used for initial transmissions of the transmission cycle. At 530, the BS transmits a set of PDSCHs to UEs 1-N during the period 520. At 532, UE 1 receives and decodes the PDSCH transmitted to UE 1 by the BS. During the period 536, the UEs 1-N transmit PUSCHs to the BS. At 534, UE 1 transmits a PUSCH including an acknowledgment (ACK) indicating that UE 1 successfully decoded the PDSCH transmitted by the BS at 532. However, the BS does not decode the PUSCH transmitted by UE 1 at 534. During the period 542, the BS processes the uplink transmissions from the UEs 1-N. The period 542 may have a length of 2-3 slots, for example. The number of slots in the period 542 may be referred to as a threshold number of slots. During the portion of period 540 remaining after period 542, a potential retransmission slot 544 occurs. The BS activates repetition including multiple transmissions for PDCCHs in the potential retransmission slot when the BS determines that the BS did not decode the PUSCH from UE 1 at 534. In the potential retransmission slot 544, the BS transmits a PDCCH 550 in a first search space, (i.e., with a first TCI state). The PDCCH 550 indicates to UE 1 that the BS is retransmitting the PDSCH 560 and scheduling the UE to transmit a PUSCH 570. The BS also transmits a repeated PDCCH 552 in a second search space (i.e., with a second TCI state) in the potential retransmission slot 545. As discussed above, while the UE does not activate repetition including multiple receptions for PDCCHs, the UE still receives the PDCCH 550. The UE then receives the retransmitted PDSCH 560 and determines to transmit the PUSCH 570 based on receiving the PDCCH 550.

Figure 6:
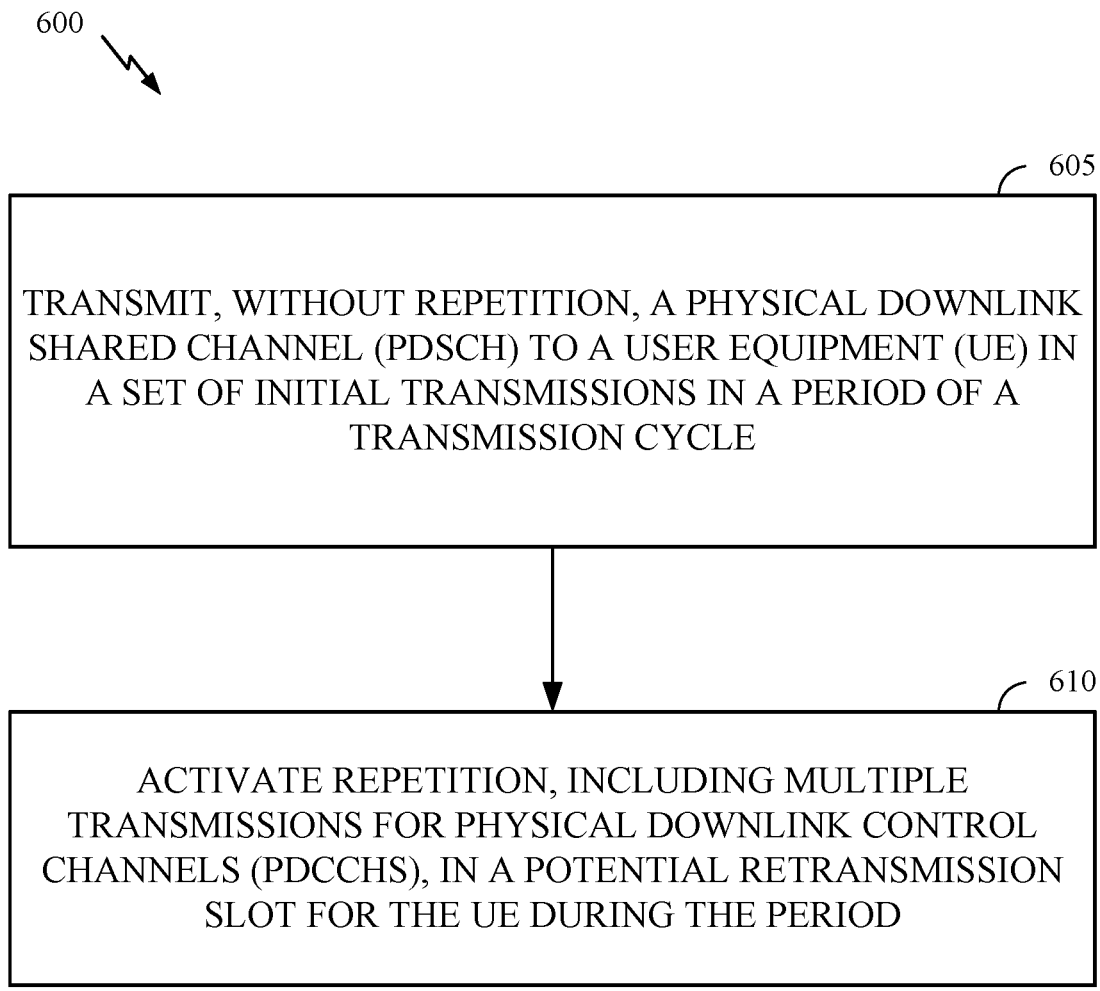
FIG. 6 is a flow diagram illustrating example operations for wireless communication by a base station (BS), in accordance with certain aspects of the present disclosure.

FIG. 6 is a flow diagram illustrating example operations 600 for wireless communication, in accordance with certain aspects of the present disclosure. The operations 600 may be performed, for example, by a BS (e.g., such as a BS 110, shown in FIGS. 1-2). Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 605, by the BS transmitting, without repetition, a physical downlink shared channel (PDSCH) to a user equipment (UE) in a set of initial transmissions in a period of a transmission cycle.

At block 610, the operations 600 may continue with the BS activating repetition, including multiple transmissions for physical downlink control channels (PDCCHs), in a potential retransmission slot for the UE during the period.

According to aspects of the present disclosure, the multiple transmissions of block 610 may be at different times.

In aspects of the present disclosure, the multiple transmissions of block 610 may be at a same time. That is, the BS may transmit two or more repetitions of a PDCCH simultaneously (e.g., on different frequency resources in one slot).

According to aspects of the present disclosure, the multiple transmissions of block 610 may be transmitted via different transmit beams.

According to aspects of the present disclosure, the multiple transmissions of block 610 may be transmitted via different transmit beams from different transmit reception points (TRPs).

In aspects of the present disclosure, a BS performing operations 600 may determine to activate the repetition based on an indication that the UE did not successfully decode the PDSCH. The indication may include a negative acknowledgment (NACK) received from the UE in response to the PDSCH. Additionally or alternatively, the indication may include not decoding an uplink transmission from the UE in the set of initial transmissions of block 605.

According to aspects of the present disclosure, a BS performing operations 600 that determines to activate the repetition based on an indication that the UE did not successfully decode the PDSCH may transmit, via a first search space (SS) configured for the UE in the potential retransmission slot and in response to the indication, a physical downlink control channel (PDCCH) scheduling a retransmission of the PDSCH; and may transmit, via a second SS configured for the UE in the potential retransmission slot and in response to obtaining the indication, a repetition of the PDCCH.

In aspects of the present disclosure, a BS performing operations 600 may determine to activate the repetition based on a block error rate (BLER) of the PDSCH.

According to aspects of the present disclosure, the potential retransmission slot of block 610 may occur a threshold number of slots after the set of initial transmissions in the period in block 605.

Figure 7:
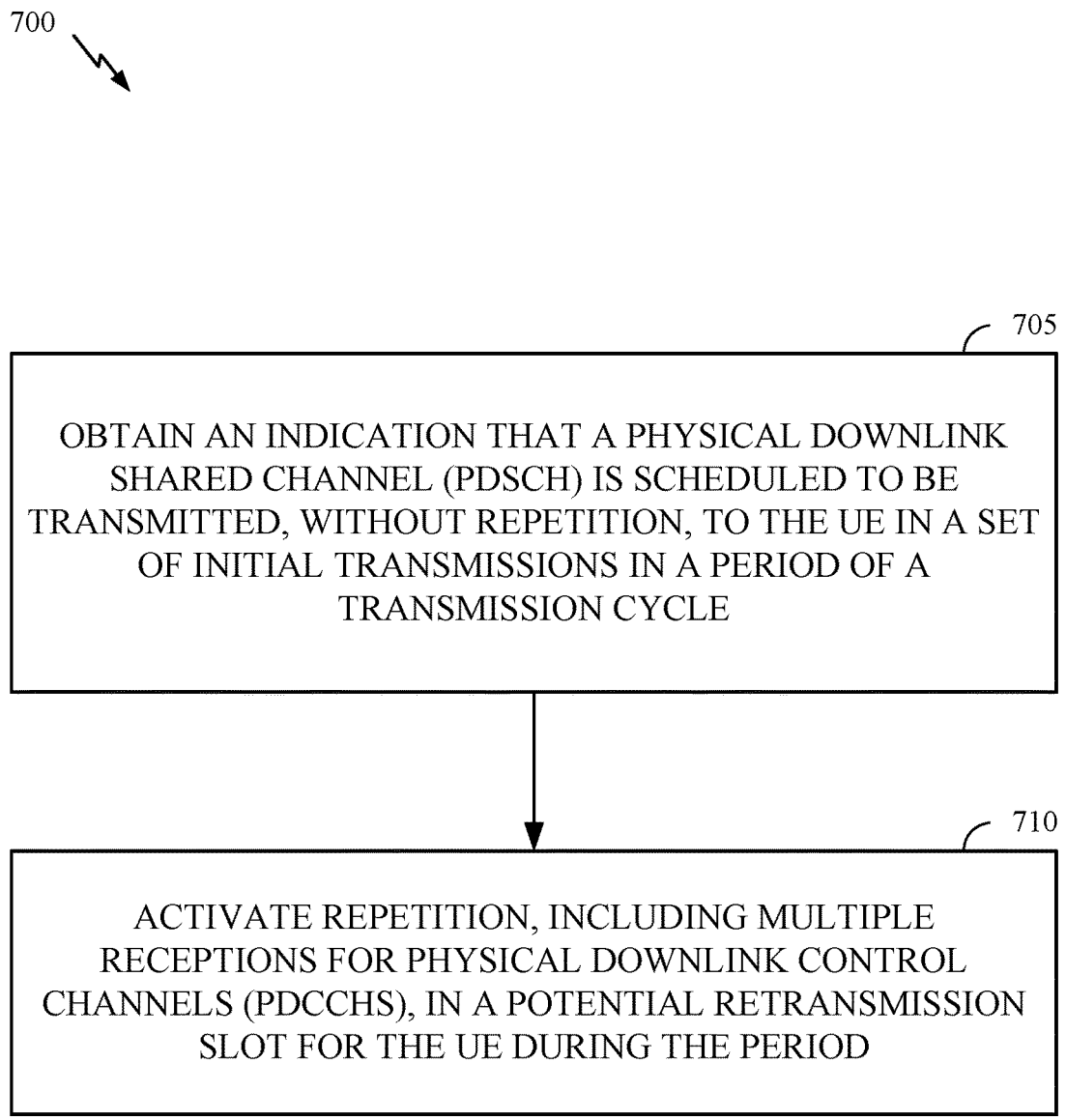
FIG. 7 is a flow diagram illustrating example operations for wireless communication by a user equipment (UE), in accordance with certain aspects of the present disclosure.

FIG. 7 is a flow diagram illustrating example operations 700 for wireless communication, in accordance with certain aspects of the present disclosure. The operations 700 may be performed, for example, by UE (e.g., such as a UE 120 in the wireless communication network 100). The operations 700 may be complimentary operations by the UE to the operations 700 performed by the BS. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 705, by the UE obtaining an indication that a physical downlink shared channel (PDSCH) is scheduled to be transmitted, without repetition, to the UE in a set of initial transmissions in a period of a transmission cycle.

At block 710, the operations 700 may continue with the UE activating repetition, including multiple receptions for physical downlink control channels (PDCCHs), in a potential retransmission slot for the UE during the period.

According to aspects of the present disclosure, the multiple receptions of block 710 may be at different times.

In aspects of the present disclosure, the multiple receptions of block 710 are at a same time.

According to aspects of the present disclosure, the multiple receptions of block 710 may be received by a UE via different receive beams.

In aspects of the present disclosure, a UE performing operations 700 may transmit a negative acknowledgment (NACK) in response to a failure to decode the PDSCH and determine to activate the repetition in block 700 based on the failure to decode the PDSCH.

According to aspects of the present disclosure, a UE performing operations 700 and determining to activate the repetition in block 700 based on the failure to decode the PDSCH may monitor a first search space (SS) configured for the UE in the potential retransmission slot for a physical downlink control channel (PDCCH) scheduling a retransmission of the PDSCH and monitor a second SS configured for the UE in the potential retransmission slot for a repetition of the PDCCH.

In aspects of the present disclosure, the potential retransmission slot of block 710 may occur a threshold number of slots after the set of initial transmissions in the period in block 705.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for selectively activating PDCCH repetition for retransmission. In certain aspects, computer-readable medium/memory 812 stores code 814 for transmitting, without repetition, a physical downlink shared channel (PDSCH) to a user equipment (UE) in a set of initial transmissions in a period of a transmission cycle. In certain aspects, computer-readable medium/memory 812 stores code 816 for activating repetition including multiple transmissions for physical downlink control channels (PDCCHs) in a potential retransmission slot for the UE during the period. In certain aspects, the processor 804 has circuitry configured to implement the code stored in the computer-readable medium/memory 812. The processor 804 includes circuitry 820 for transmitting, without repetition, a physical downlink shared channel (PDSCH) to a user equipment (UE) in a set of initial transmissions in a period of a transmission cycle and circuitry 824 for activating repetition including multiple transmissions for physical downlink control channels (PDCCHs) in a potential retransmission slot for the UE during the period.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for selectively activating PDCCH repetition for retransmission. In certain aspects, computer-readable medium/memory 912 stores code 914 for obtaining an indication that a physical downlink shared channel (PDSCH) is scheduled to be transmitted, without repetition, to the wireless communications device in a set of initial transmissions in a period of a transmission cycle. In certain aspects, computer-readable medium/memory 912 stores code 916 for activating repetition including multiple receptions for physical downlink control channels (PDCCHs) in a potential retransmission slot for wireless communications device UE during the period. In certain aspects, the processor 904 has circuitry configured to implement the code stored in the computer-readable medium/memory 912. The processor 904 includes circuitry 920 for obtaining an indication that a physical downlink shared channel (PDSCH) is scheduled to be transmitted, without repetition, to the wireless communications device in a set of initial transmissions in a period of a transmission cycle and circuitry 924 for activating repetition including multiple receptions for physical downlink control channels (PDCCHs) in a potential retransmission slot for the wireless communications device during the period.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, the operations illustrated in FIGS. 6-7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a base station (BS), comprising:
   transmitting, without repetition, a physical downlink control channel (PDCCH) transmission scheduling a physical downlink shared channel (PDSCH) transmission to a user equipment (UE), wherein the PDCCH transmission is in a set of initial transmissions in a period of a transmission cycle; and
   selectively activating PDCCH repetition when one or more conditions associated with the PDSCH transmission are satisfied, wherein the PDCCH repetition includes transmitting multiple PDCCH transmissions scheduling a retransmission of the PDSCH transmission during the period of the transmission cycle.

2. The method of claim 1, wherein the multiple PDCCH transmissions are at different times.

3. The method of claim 1, wherein the multiple PDCCH transmissions are at a same time.

4. The method of claim 1, wherein the multiple PDCCH transmissions are transmitted via different transmit beams and from a plurality of transmit reception points (TRPs).

5. The method of claim 1, wherein the scheduling comprises scheduling the retransmission of the PDSCH transmission in a potential retransmission slot for the UE during the period of the transmission cycle.

6. The method of claim 5, wherein transmitting the multiple PDCCH transmissions includes:
transmitting, via a first search space (SS) configured for the UE in the potential retransmission slot, a PDCCH transmission to the UE; and
transmitting, via a second SS configured for the UE in the potential retransmission slot, a repetition of the PDCCH transmission.

7. The method of claim 5, wherein the potential retransmission slot occurs a threshold number of slots after the set of initial transmissions in the period of the transmission cycle.

8. The method of claim 1, further comprising:
determining to activate the PDCCH repetition based on an indication indicating the one or more conditions associated with the PDSCH transmission are satisfied, wherein the one or more conditions associated with the PDSCH transmission are satisfied when the UE did not successfully decode the PDSCH transmission.

9. The method of claim 8, wherein the indication comprises a negative acknowledgment (NACK) received from the UE in response to the PDSCH transmission.

10. The method of claim 8, wherein the indication comprises not decoding an uplink transmission from the UE in the set of initial transmissions.

11. The method of claim 1, further comprising:
determining to activate the PDCCH repetition when the one or more conditions associated with the PDSCH transmission are satisfied, wherein the one or more conditions associated with the PDSCH transmission are satisfied when a block error rate (BLER) of the PDSCH transmission is below a threshold.

12. A method for wireless communications by a user equipment (UE), comprising:
obtaining an indication that a physical downlink shared channel (PDSCH) transmission is scheduled to be transmitted, without repetition of a physical downlink control channel (PDCCH) scheduling the PDSCH transmission, to the UE in a set of initial transmissions in a period of a transmission cycle; and
selectively activating PDCCH repetition when one or more conditions associated with the PDSCH transmission are satisfied, wherein the PDCCH repetition includes monitoring multiple receptions of PDCCH transmissions scheduling a retransmission of the PDSCH transmission during the period of the transmission cycle.

13. The method of claim 12, wherein the multiple receptions are at different times.

14. The method of claim 12, wherein the multiple receptions are at a same time.

15. The method of claim 12, wherein the multiple receptions are received via different receive beams.

16. The method of claim 12, further comprising:
transmitting a negative acknowledgment (NACK) in response to a failure to decode the PDSCH transmission; and
determining to activate the PDCCH repetition when the one or more conditions associated with the PDSCH transmission are satisfied based on the failure to decode the PDSCH transmission.

17. The method of claim 16, wherein monitoring the multiple receptions includes:
monitoring a first search space (SS) configured for the UE in a potential retransmission slot for a PDCCH transmission scheduling a retransmission of the PDSCH transmission; and
monitoring a second SS configured for the UE in the potential retransmission slot for a repetition of the PDCCH transmission.

18. The method of claim 12, wherein:
the scheduling comprises scheduling the retransmission of the PDSCH transmission in a potential retransmission slot for the UE during the period of the transmission cycle, and
the potential retransmission slot occurs a threshold number of slots after the set of initial transmissions in the period of the transmission cycle.

19. An apparatus for wireless communications, comprising:
a processor configured to:
transmit, without repetition, a physical downlink control channel (PDCCH) transmission scheduling a physical downlink shared channel (PDSCH) transmission to a user equipment (UE) in a set of initial transmissions in a period of a transmission cycle; and
selectively activate PDCCH repetition when one or more conditions associated with the PDSCH transmission are satisfied, wherein the PDCCH repetition includes transmitting multiple PDCCH transmissions scheduling a retransmission of the PDSCH during the period of the transmission cycle; and
a memory coupled with the processor.

20. The apparatus of claim 19, wherein the multiple PDCCH transmissions are at different times.

21. The apparatus of claim 19, wherein the multiple PDCCH transmissions are at a same time.

22. The apparatus of claim 19, wherein the multiple PDCCH transmissions are transmitted via different transmit beams.

23. An apparatus for wireless communications, comprising:
a processor configured to:
obtain an indication that a physical downlink shared channel (PDSCH) transmission is scheduled to be transmitted, without repetition of a physical downlink control channel (PDCCH) scheduling the PDSCH transmission, to the apparatus in a set of initial transmissions in a period of a transmission cycle; and
selectively activate PDCCH repetition when one or more conditions associated with the PDSCH transmission are satisfied, wherein the PDCCH repetition includes monitoring multiple receptions of PDCCH transmissions scheduling a retransmission of the PDSCH transmission during the period of the transmission cycle; and
a memory coupled with the processor.

24. The apparatus of claim 23, wherein the multiple receptions are at different times.

25. The apparatus of claim 23, wherein the multiple receptions are at a same time.

26. The apparatus of claim 23, wherein the multiple receptions are received via different receive beams.

27. The apparatus of claim 23, wherein the processor is further configured to:
transmit a negative acknowledgment (NACK) in response to a failure to decode the PDSCH transmission; and determine to activate the PDCCH repetition when the one or more conditions associated with the PDSCH transmission are satisfied based on the failure to decode the PDSCH transmission.

28. The apparatus of claim 27, wherein the processor being configured to monitor the multiple receptions of PDCCH comprises the processor being configured to:
monitor a first search space (SS) configured for the apparatus in a potential retransmission slot for a PDCCH transmission scheduling a retransmission of the PDSCH transmission; and
monitor a second SS configured for the apparatus in the potential retransmission slot for a repetition of the PDCCH transmission.

29. The apparatus of claim 23, wherein:
the scheduling comprises scheduling the retransmission of the PDSCH transmission in a potential retransmission slot for the apparatus during the period of the transmission cycle, and
the potential retransmission slot occurs a threshold number of slots after the set of initial transmissions in the period.

* * * * *